(12) United States Patent
Knoop

(10) Patent No.: US 7,593,686 B1
(45) Date of Patent: Sep. 22, 2009

(54) METHOD AND SYSTEM FOR SELECTING TRANSMISSION MODES FOR STREAMING MEDIA CONTENT TO A WIRELESS HANDSET ACCESS TECHNOLOGY

(75) Inventor: Dale Knoop, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1633 days.

(21) Appl. No.: 10/059,538

(22) Filed: Jan. 29, 2002

(51) Int. Cl.
*H04H 1/00* (2006.01)
*G06F 15/16* (2006.01)

(52) U.S. Cl. .................... 455/3.04; 455/3.01; 455/3.03; 455/464; 455/62; 455/566; 709/203; 709/217; 709/218; 709/227

(58) Field of Classification Search .............. 455/414.1, 455/414.2, 414.3, 414.4, 517, 3.01, 3.03, 455/3.04, 3.06, 466, 574, 464, 62, 403, 422.1, 455/514; 709/217, 218, 219, 203, 227
See application file for complete search history.

(56) References Cited

U.S. PATENT DOCUMENTS

| | | | |
|---|---|---|---|
| 6,366,782 B1* | 4/2002 | Fumarolo et al. ............ 455/457 |
| 6,779,195 B2* | 8/2004 | Oishi et al. .................... 725/68 |
| 6,802,035 B2* | 10/2004 | Catreux et al. .............. 714/746 |
| 6,952,279 B1* | 10/2005 | Iida ............................ 358/1.15 |
| 2001/0029191 A1* | 10/2001 | Wilhelm ...................... 455/552 |
| 2002/0052889 A1* | 5/2002 | Shinoda ....................... 707/500 |
| 2002/0099790 A1* | 7/2002 | Mosher et al. ............... 709/217 |
| 2002/0103881 A1* | 8/2002 | Granade et al. ............. 709/218 |
| 2002/0120925 A1* | 8/2002 | Logan ........................... 725/9 |
| 2002/0160790 A1* | 10/2002 | Schwartz et al. ............ 455/456 |
| 2003/0079020 A1* | 4/2003 | Gourraud et al. ............ 709/227 |

OTHER PUBLICATIONS

C. Perkins, Internet Engineering Task Force Request for Comment 2002, Oct. 1996.
Handley, et al., Internet Engineering Task Force Request for Comment 2543, Mar. 1999.
Handley, et al., Internet Engineering Task Force Request for Comment 2327, Apr. 1998.

* cited by examiner

*Primary Examiner*—Huy Q Phan

(57) ABSTRACT

A wireless handset may connect to a media server in order to receive streaming media content. The wireless handset may send the media server one or more indications of the wireless handset's presentation capabilities. In response, the media server may send the wireless handset a list of media content and transmission modes, and the list of media content and transmission modes may be tailored, at least in part, based on the presentation capabilities of the wireless handset. A user of the wireless handset may then select from the list of media content, and the media server may stream the media content to the wireless handset using the selected transmission mode.

18 Claims, 6 Drawing Sheets

METHOD AND SYSTEM FOR SELECTING TRANSMISSION MODES FOR STREAMING MEDIA CONTENT TO A WIRELESS HANDSET ACCESS TECHNOLOGY

BACKGROUND

1. Field of the Invention

The present invention relates to client-server computing. More specifically, it relates to a method for selecting transmission modes for streaming media content from a media server to a wireless handset.

2. Description of Related Art

A client device, such as a wireless handset, can connect to a media server. Once connected to the media server, the client device may receive real-time streaming media content from the media server. For example, the client device may receive a video clip that is played on the client device's display screen in real-time. Simultaneously, the client device may receive audio that is played on an audio speaker and that accompanies the video clip. Other media content, such as audio-only files or still images, may also be streamed from the media server to the client device.

The client device may play media content using a media player application. The media content is streamed to the client using a transmission mode. A transmission mode generally defines properties used for transmitting the media content to the client device, and the media player application may support one or more transmission modes. For example, the media player application may support variable bit-rate transmissions, audio and video media content, and various media content formats. In order to increase the number of transmission modes supported by the client device, more than one media player application may reside on the client device.

When the client device connects to the media server, the media server may send the client device a selection of media content choices, including transmission modes. The client device user may then select from one of the media content choices and a corresponding transmission mode. In choosing media content from the choices provided by the media server, a user may select media content that cannot be played on the client device. For example, the user may select media content that is not supported by a media player application on the client device. The media player application may not recognize the format used by the media server, and it may not be able to properly output the media content on the client device. In another example, the user may select media content that is not support by the output features of the client device. The media player application may recognize the format, but the device may not have the output capabilities to player the media content. For instance, the media player application may receive a video clip from the server, but the client device may not have a display screen.

The client device may connect to the media server using a wireless connection. For example, the client device may connect to a wireless network, and the wireless network may then provide connectivity to the media server. The wireless connection, however, may not support all possible transmission modes, because, for instance, the wireless connection may only support a limited bandwidth. The limited bandwidth on the wireless network may limit the maximum bit-rate used to send data from the media server to the client device, thereby limiting the permissible transmission modes to those transmission modes that use a bit-rate which is less than the maximum supported by the wireless connection. Other factors on the wireless network may also limit the permissible transmission modes. For instance, the wireless network may be congested, and it may not be able to support high bit-rate connections. In spite of these, or other, limitations of the wireless network, the media server may provide the user of a client device with media content choices and transmission modes that are not supported by the wireless network, and the user of a client device may select a media content choice and a transmission mode that are not supported by the wireless network.

Therefore, there exists a need to provide a better way of selecting transmission modes for streaming media content to a wireless handset.

SUMMARY

A wireless handset may connect to a media server in order to receive streaming media content. The wireless handset may send the media server one or more indications of the wireless handset's presentation capabilities. In response, the media server may send the wireless handset a list of available media content, and the media content may correspond to one or more transmission modes. The list of available media content, and the corresponding transmission modes, may be tailored, at least in part, based on the presentation capabilities of the wireless handset.

In one embodiment, the media server may tailor the list of available media content based, at least in part, on whether the media content is supported by one or more media player applications on the wireless handset. In another embodiment, the media server may tailor the list of available media content based, at least in part, on whether the output features of the wireless handset support the output of the media content. In yet another embodiment, the media server may limit the list of available media content based, at least in part, on specifications provided by a user. Once the tailored list of media content has been provided to the wireless handset, a wireless handset user may then select from the list. Following the user's selection, the media server may then stream the media content to the wireless handset using the selected transmission mode.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
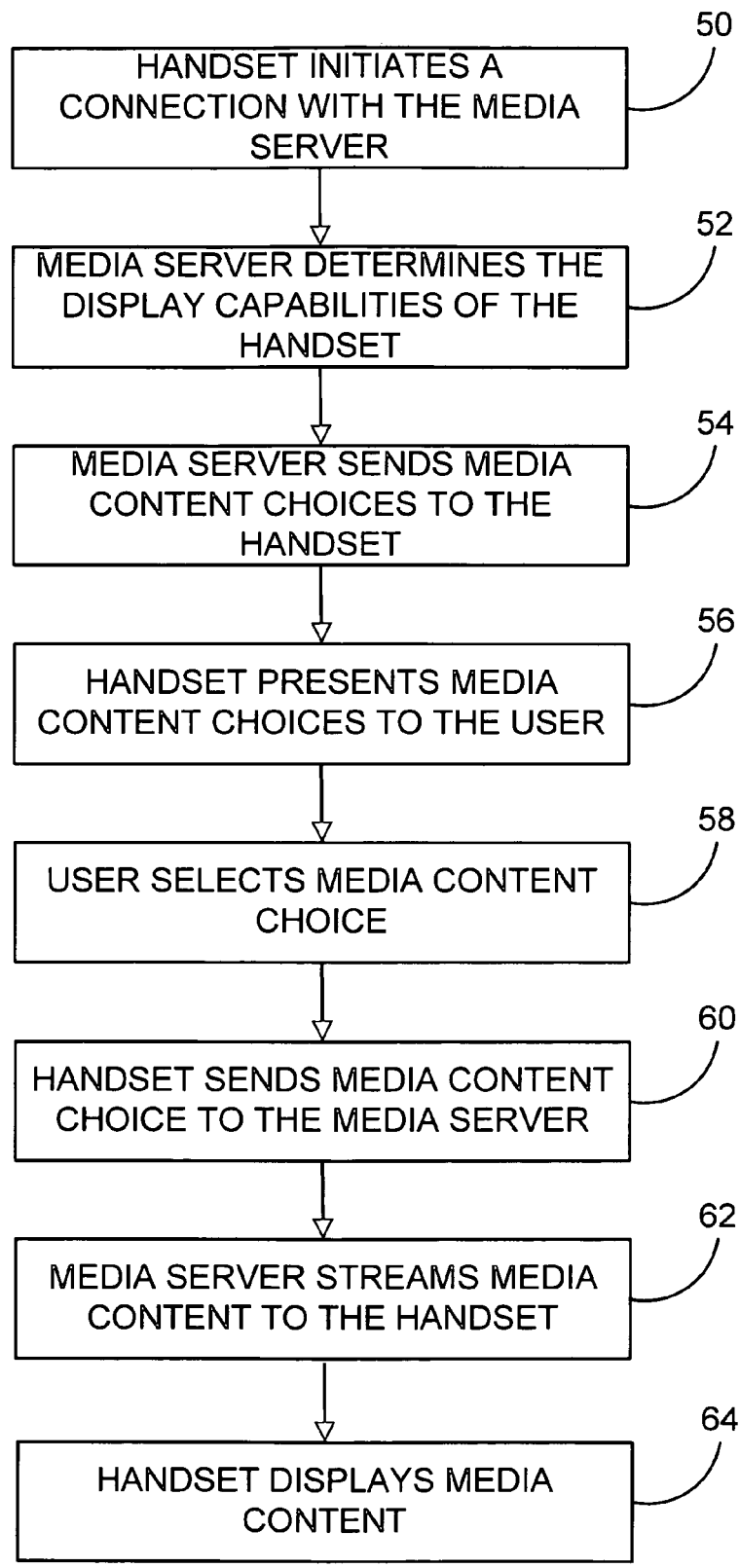
FIG. 1 is a flowchart illustrating one embodiment of a process for a wireless handset receiving streaming media content from a media server.

FIG. 1 is a flowchart illustrating one embodiment of a process for a wireless handset receiving streaming media content from a media server. At Step 50, a wireless handset initiates a connection with a media server. Next, at Step 52, the media server determines the presentation capabilities of the wireless handset. Then, at Step 54, the media server sends the wireless handset a list of media content choices. The list of media content choices may indicate the transmission modes for delivering the streaming media content to the wireless handset, and the list of media content choices may be tailored to the presentation capabilities of the wireless handset. At Step 56, the wireless handset presents those choices to a user. Then, at Step 58, the user selects one of the media content and transmission mode choices. The wireless handset then informs the media server of the user's choice, as shown at Step 60. At Step 62, the media server streams the media content to the wireless handset at the selected transmission mode. Finally, at Step 64, the wireless handset presents the media content to the user.

1. Exemplary Architecture

Figure 2:
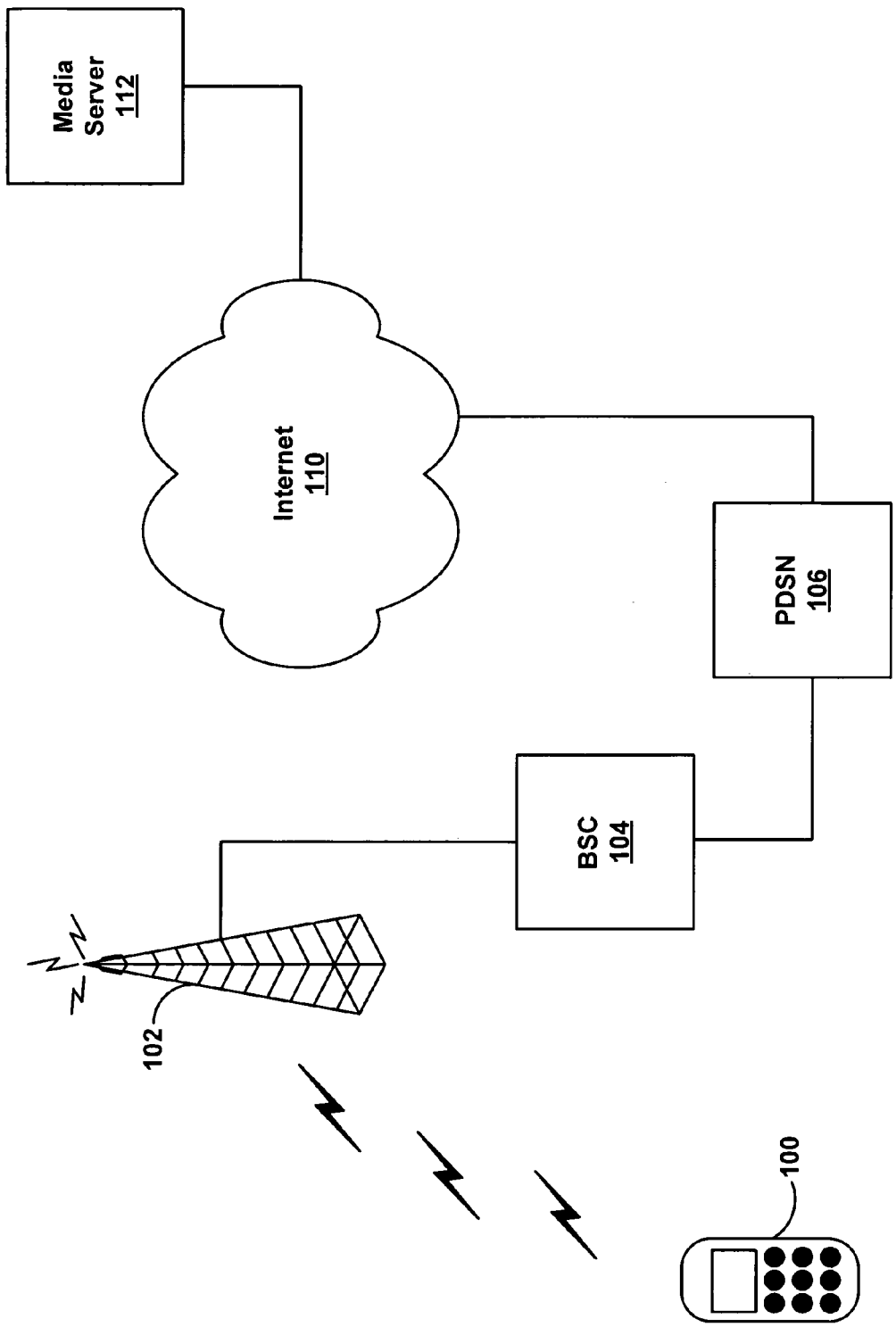
FIG. 2 shows an exemplary architecture that may be used to implement the process described in FIG. 1.

FIG. 2 shows an exemplary architecture for facilitating communication between a wireless handset 100 and a media server 112. In a preferred embodiment, the wireless handset 100 is a third generation (3G) cellular telephone. The wireless handset 100 may include a display screen, an audio speaker, a keypad, or other input or output features. In a preferred embodiment, the wireless handset 100 is multimedia equipped, and it is capable of displaying video and playing audio. Other devices may also be used, and they may contain a fewer or greater number of features. For example, in one embodiment, the wireless handset 100 is only capable of playing audio. In another embodiment, the wireless handset 100 is a wirelessly equipped personal digital assistant (PDA). In yet another embodiment, the wireless handset 100 is a wirelessly equipped computer.

The wireless handset 100 ordinarily includes a processor and memory. Applications can be stored in the memory and executed on the processor. The applications may utilize the various input and output features of the wireless handset 100, and, thereby, interact with the user. For example, an application may output video on a display screen, it may play audio on a speaker, it may receive input from a keypad, or it perform a combination of these or other actions. Preferably the memory contains a web browser application (such as the OpenWave™ Microbrowser) and a media content player application. One or more media content player applications may be stored in memory, and they can be used to receive media content from the media server and to present the media content on the wireless handset's output features. A wireless handset 100 may support more than one media content application, and media content player applications may be added or removed from the wireless handset 100.

The media server 112 may be any computer or other device capable of streaming media. In a preferred embodiment, the media server 112 is a server class computer, and it contains a processor and memory. The processor executes applications, which may be stored in memory. Preferably, the media server 112 stores a web server application, a streaming media application and media content. The web server application generally allows users to connect to the media server through a web page or web card, although it may also support other methods of connections or other functions. The streaming media application, among other functions, may be used to stream media content to a wireless handset 100 connected to the media server 112. Other applications, however, may be used to send media content to the wireless handset 100. The media server 112 may support additional applications, and it may combine the functionality needed to stream media content into one or more other applications.

As previously indicated, the media server 112 generally includes memory that stores media content. Media content may be stored in the memory using a variety of different data storage devices. For example, the media content may be stored on a hard disk or a floppy disk. Additionally, it may be stored on a CD-ROM, a tape drive, a zip drive, or any other number of data storage devices. Media content may also be stored on a combination of data storage devices. For example, the media server 112 may store some media content files on a hard disk, while it may store other media content files on a CD-ROM drive. Other combinations are also possible.

In a robust arrangement, a given instance of media content can be stored as a single file in the media server's memory. The file can be transmitted to a wireless handset 100 using one or more different transmission modes. A transmission mode generally specifies parameters used to send media content to the wireless handset 100. A transmission mode can specify, for instance: a high bit rate, a low bit rate, other specific bit rates, video only, audio only, video plus audio, and periodic stills plus audio. This list of parameters is not exhaustive, and other parameters may also be specified. Alternatively, a media content file might correspond to only one transmission mode. Combinations of these or other method can be used to store multiple files and transmission modes. In addition to specifying transmission parameters, such as bit-rates or audio/video capabilities, a transmission mode may also specify the format of the media content.

Each instance of media content may be stored in one or more different encoded formats. A format generally defines a procedure for storing audio, video or other data in a stream of bits. Then, at a later time, the format can be used to reconstruct the stream of bits into the original representation. Examples of common formats include JPEG, MPEG and MP3, but many other formats for media content are available, and these may also be used.

In a preferred embodiment, the wireless handset 100 and the media server 112 communicate over the Internet 110 or over another public or private network. The wireless handset 100 connects to a cellular network, and the cellular network, in turn, provides connectivity to the Internet 110. The media server 112 also connects to the Internet 110. Once the media server 112 and the wireless handset 100 are both connected to the Internet 110, they can exchange data.

In particular, the wireless handset 100 is linked by an air interface to a base station 102. The wireless handset 100 can communicate with the base station 102 using a variety of different protocols. In a preferred embodiment, the wireless handset 100 communicates with the base station 102 using Code Division Multiple Access (CDMA). CDMA provides a method for sending wireless signals between the wireless handset 100 and the base station 102. In a CDMA system the base station 102 communicates with the wireless handset 100 over a spread spectrum of frequencies. Typical components for CDMA systems include those described in the Telecommunications Industry Association (TIA) standard, ANSI/TIA/EIA-95-B-99, dated Feb. 3, 1999, which is incorporated herein by reference in its entirety. Time Division Multiple Access (TDMA) is another popular method for wireless communications. In TDMA systems, the base station 102 typically communicates on a group of frequencies, and each frequency may itself carry at least one multiplexed call. The Global System for Mobile Communications (GSM) or another method may also be used.

The base station 102 is coupled to a base station controller (BSC) 104. The BSC 104 connects with a packet data serving node (PDSN) 106. The PDSN 106 provides connectivity, to a packet-switched network, such as the Internet 110. Once the wireless handset 100 connects to the Internet 110 through the telecommunications network, it can exchange data with other devices also connected to the Internet 110. This may be done using an appropriately supported protocol.

The wireless handset 100 may exchange data over the Internet 100 using a protocol suite, such as the Internet Protocol (IP) and the Transmission Control Protocol (TCP). TCP is one connection-oriented protocol used to send data over a network, such as the Internet. When used in conjunction with other protocols, such as IP, TCP provides a format for breaking a data message into segments, transmitting the segments over the network to a receiver, and reassembling the segments at the receiver to form the original data message.

IP provides a method for transmitting data between devices on the same or on different networks. Each device is assigned an IP address, which is 32-bits long. The IP address assigned to a device is usually globally unique across the connected networks, and this allows data to be accurately sent between devices on different networks. Data to be transmitted between devices is placed into an IP segment. The header of the IP segment contains the source and destination IP addresses of the two communicating devices. The segment is sent over the network, and, using the destination device's IP address contained in the header, appropriately routed to the destination device. The segment may travel through different devices and across different networks before ultimately reaching its destination, and the IP address helps to ensure accurate routing through these devices.

IP, however, does not provide a mechanism to assure that segments will be received at their intended destination. They may be lost during transmission due to data corruption, buffer overflow, equipment failure or other problems. TCP complements IP by ensuring reliable end-to-end transmission of the segments. Among other functions, TCP handles lost or corrupted segments, and it reassembles segments that arrive at their destination out of order. TCP/IP is one method of establishing a connection between the handset and media server, and other Internet or network protocols may also be used.

For example, the wireless handset may use Mobile IP, which is an extension of IP. IP can be used to connect devices on separate networks. An IP address is usually associated with one particular network; however, a wireless device with an assigned IP address may roam through more than one network during a call. Mobile IP is an extension of the IP protocol, and Mobile IP allows a device to move across different networks although its IP address may only be associated with one particular network. Mobile IP is described in detail in the Internet Engineering Task Force Request for Comment 2002, C. Perkins, October 1996, which is incorporated herein by reference in its entirety.

The media server 112 may also connect to the Internet 110. For instance, the media server 112 may be part of a local area network (LAN), and it may connect to the LAN using a network interface card (NIC). The LAN, in turn, may provide connectivity to the Internet 110 through an Internet Service Provider (ISP) or another gateway. Alternatively, the media server 112 may connect to a private intranet (e.g., a core packet network of a wireless service provider) or to another network that provides connectivity to the Internet 110.

Once connected to the Internet 110, the wireless handset 100 and the media server 112 can communicate with each other using a variety of different protocols. In one embodiment, the wireless handset 100 and the media server 112 establish a connection and exchange data using the TCP/IP protocols. In another embodiment, and as previously described, the wireless handset 100 may use Mobile IP in conjunction with TCP. Many other protocols exists for exchanging data between devices connected to the Internet or to other networks, and these may also be used.

The foregoing discussion illustrates one exemplary embodiment of system for communication between a wireless handset 100 and a media server 112. Many variations may be made to the system shown in FIG. 2, and many other systems may also be used. For example, changes may be made to the configuration of the cellular network. In another example, the media server 112 may interface with the Internet in a different manner. In yet another example, the wireless handset 100 and the media server 112 may reside on the same network, and they may not communicate over the Internet. These examples are not exhaustive, and other variations are also possible.

2. Exemplary Operation

According to one embodiment, when a user wishes to obtain media content from the media server, the user invokes a suitable application on the wireless handset. For instance, the user may start a media content player, a web browser or another application. Ordinarily after the user starts the application, the wireless handset attempts to connect to the media server. This may be done by first connecting to the wireless handset's cellular network. Then, once connected to the cellular network, the wireless handset can connect to the Internet and then ultimately to the media server.

The wireless handset may connect to its cellular network, for instance, by communicating with the base station, or other access point, in the cellular network. While the cellular network connection preferably occurs automatically upon starting the application, it may also be established manually by the user or in another way. Alternatively, the wireless handset may already be connected to the cellular network upon starting the application. Then, once the application runs, it uses the existing cellular network connection to access the Internet and connect to the media server.

After the wireless handset connects to the Internet, generally through the cellular network, the application may establish a connection and communicate with the media server in a variety of ways. For example, using a web browser on the wireless handset (which may also be referred to as a microbrowser), the user may browse to a web card. The media server hosts the web card, which is the microbrowser analog of a Hypertext Markup Language (HTML) web page. Alternatively, the user may have invoked a different application, such as a media content player, and the application may use a different method for interfacing with the media server. The web browser or other application may use one or more different protocols to connect and exchange data with the media server. In a preferred embodiment, the wireless handset establishes a connection with the media server using the TCP/IP protocol suite, but other methods may also be used.

As another example, the user may establish a connection with the media server by invoking an option on the media player application that sends a standard or proprietary session initiation request to the media server. For example, the media player application may send a SIP INVITE request to the media server. SIP stands for "Session Initiation Protocol" and is described in detail in the Internet Engineering Task Force Request for Comment 2543, Handley et al., March 1999, which is incorporated herein by reference in its entirety. The protocol provides a method by which a session can be established between two or more devices. The structure of a SIP message is similar to the Hypertext Transfer Protocol (HTTP), which is well known.

Once the wireless handset and the media server have established a connection, they may engage in a procedure to determine the media presentation capabilities of the wireless handset; although, as will be discussed later, the presentation capabilities may also be determined during the connection process. The media presentation capabilities of the wireless handset may be determined, for example, by sending a capability indication from the wireless handset to the media server indicating the wireless handset's presentation capabilities. The presentation capabilities of the wireless handset may be based on the wireless handset's make and model, the presentation capabilities of applications on the wireless handset or other factors.

To determine the wireless handset's presentation capabilities, for example, an application on the wireless handset may send the media server an indication of the make and model of the wireless handset. The media server may have in its memory, or otherwise have access to, a translation table that correlates makes and models of wireless handsets with their presentation capabilities. The translation table may negatively indicate the presentation capabilities of a certain make and model of wireless handset, such as, that the handset does not support video, does not support data exchanges above a certain bit rate, or other limitations. Alternatively, the translation table may affirmatively indicate the presentation capabilities of the wireless handset, such as that it supports audio, it supports a certain maximum bit rate, or other characteristics. In another embodiment, the translation table may contain both affirmative and negative indications of a wireless handset's capabilities. When the media server receives the make and model of the wireless handset, it may then determine the presentation capabilities of the wireless handset by using the translation table.

Likewise, the application may send to the media server its name, version number, or other information. The media server may then use a translation table to determine the presentation capabilities of the application. The presentation capabilities of an application may define, for example, the wireless handset's output features that the application is capable of using, formats the application recognizes, transmission rates the application supports or other capabilities. The application may, for example, only support audio media content. Also, it may only support certain media content formats, such as MPEG, or other transmission parameters, such as a bit-rate below 300 kbs. The application may also have other presentation limitations.

In addition to sending information about itself, the application may also send information about other applications on the wireless handset that could also be used to process media content. The application may get information about other applications available on the wireless handset from a variety of different sources. In one example, the application may access a registry stored on the wireless handset. The registry may contain information about other applications that are available on the wireless handset. The registry may be periodically updated to reflect applications that are installed on the wireless handset or removed from the wireless handset.

In another embodiment, the application on the wireless handset may send the media server a more direct indication of the wireless handset's capabilities. For instance, the application may send the media server the set of parameters that indicate the presentation capabilities of the wireless handset. Additionally, the application may send the media server an indication of the presentation capabilities supported by that application or by other applications on the wireless handset.

Further, the application may send the media server presentation capabilities specified by the user. A combination of these methods may also be used.

For example, the media server may receive a make and model of a wireless handset, which the media server can then use to lookup the handset's presentation capabilities. Additionally, the wireless handset may send a list of presentation capabilities to the media server. The list of presentation capabilities may update the presentation capabilities found in the media server's translation table; it may contain information about applications on the wireless handset; it may contain user-specified presentation capabilities; or, it may otherwise provide presentation capability information. The presentation capability list may then be used to supplement the presentation capabilities determined from the translation table.

In one embodiment, the media player application can be configured with parameters indicating permissible transmission modes, and this information can be sent to the media server to use in determining the wireless handset's presentation capabilities. The permissible transmission modes may correspond to transmission modes that are supported by the capabilities of the wireless handset or are supported by the media player applications. The parameters may be varied based on a user's selections. For example, the parameters may have default values corresponding to the transmission modes supported by the wireless handset and its applications. Then, the user may further limit the transmission modes to those that are acceptable to the user. It is possible that a user may select transmission modes that are not supported by the wireless handset or its applications, and it is also possible that the user may not select transmission modes that otherwise would be supported by the wireless handset or its applications. A user can set these parameters, for instance, through a configuration program on the wireless handset or through the application. The user may initially configure the parameters when the application is loaded onto the wireless handset, or the user may configure them at a later time. The wireless handset might also come preprogrammed from the manufacturer with these parameters, such as in a separate configuration file accessible by the media player application. The media player application may also come with a default set of parameters that may be used unless the user makes an alternate selection.

Preferably, the selected parameters correspond to the capabilities of the wireless handset and its applications. For example, if the media player application and wireless handset are able to receive and present streaming media in any mode from high bit rate audio and video down to low bit rate audio-only, the media player application may be configured with a list of transmission modes that includes those modes. However, if the combination of the media player application and the wireless handset are able to receive and present streaming audio but are only able to receive and present streaming video at only a very slow frame rate, the media player application may be configured with a list of transmission modes that excludes the high bit rate audio and video mode. Other configurations are also possible.

Once the wireless handset and applications have been configured, that information may be sent to the media server to be used in determining the wireless handset's presentation capabilities. For instance, when an application establishes a connection with a media server, the application may then send information to the media server that can be used to determine the wireless handset's presentation capabilities. The presentation capabilities may be determined in a manner previously described, or in another way. For example, the application may send the make and model of the wireless handset, which is then used to determine the wireless handset's presentation capabilities by reference to a translation table. The application might also send a list of available applications, which are also used to determine the wireless handset's presentation capabilities also by reference to a translation table. The application may additionally provide information specified in one or more of the application's or wireless handset's configuration files. It is also possible to send only one indication, such as only the make and mode of the wireless handset, only the name and version of the application, or only information from a configuration file. Other combinations of this or other information may also be sent.

While the presentation capabilities can be specified after the wireless handset establishes a connection with the media server, they may also be specified during the connection process. For instance, the wireless handset may establish a connection with the media server by sending a SIP INVITE message. The SIP INVITE message can include within the body of the message a Session Description Protocol (SDP) structure describing the presentation capabilities of the wireless handset. The SDP may describe, for instance, what audio/video capabilities are available, the make and model of the wireless handset, available applications or other properties. The SDP protocol is described in further detail in the Internet Engineering Task Force Request for Comment 2327, Handley et al., April 1998, which is incorporated herein by reference in its entirety.

By determining the presentation capabilities of the wireless handset and its applications, the media server may tailor its content for a particular wireless handset. For instance, the media server may only provide the wireless handset with streaming media content that is supported by the wireless handset. A wireless handset may not be able to support all types of streaming media content, because streaming media content may be provided to the wireless handset in a variety of different transmission modes, and all the transmission modes may not be supported by the wireless handset or by its applications. The streaming media content may also not be supported, because the streaming media content may utilize a variety of different outputs or other features that may not be supported by the wireless handset.

For example, certain real-time media content can be streamed to a wireless handset at various different transmission modes, each of which may consume a different level of bandwidth. In one transmission mode, media content that contains audio and video could be transmitted to a wireless handset in a "full experience" mode, including both the audio and video. Alternatively, in another transmission mode, the media content could be transmitted to the wireless handset in a scaled down "audio-with-stills" mode, made up of the audio and periodic, still images from the video. Still alternatively, in yet another transmission mode, the media content could be transmitted to the wireless handset in a further scaled down "audio-only" mode, omitting any video and still images. The full experience mode generally consumes the most bandwidth, while the audio-with-stills mode consumes less bandwidth, and the audio-only mode consumes even less bandwidth.

The wireless handset may connect to the Internet over a connection that limits its available bandwidth. Therefore, the wireless handset may not be able to receive information at the high bandwidth required to support the "full experience" audio and video transmission mode. As another example, the wireless handset may not have a display screen, and, therefore, it cannot fully support transmission modes that stream video or provide stills to the wireless handset. In yet another example, the media server may stream video at a certain frame rate, and the display on the wireless handset may not be capable of displaying video at that frame rate. Therefore, the wireless device may not fully support that transmission mode. In another example, the application running on the handset may only support playing audio. It may not be capable of receiving and displaying video. Therefore, any transmission mode that sends video to the application would not be fully supported.

In addition, the transmission modes may provide streaming media content in many different formats, and these may also limit the wireless handset's capabilities. The wireless handset generally includes one or more media player applications, which function to receive streaming media content and present the media content to the user. The applications may be capable of receiving data in one or more formats; however, if the format used by the media server is not supported by the wireless handset or its applications, then the streaming media content may not be properly displayed or presented to the user. In addition to outputting the audio, video or other signals, the application may include controls selectable by the user to play, pause, stop, rewind or fast-forward the streaming media content, and these features may not function properly if the media content format is not supported by the media player application.

In order to properly output streaming media content on the wireless handset, the media player application should support the format used by the streaming media content. A format may include a procedure for converting audio, video or other data into a binary representation. The binary representation can then be stored on the media server and eventually streamed to the media player application on the wireless handset. Using the format, the media player application can interpret the stream of bits and convert the binary representation back into the original audio and video forms. If the media player application does not support the format of the media content, the media player application may not be able to properly convert the binary data back into the original signal. While a media player application may support one or more formats, it does not necessarily support all possible formats. Therefore, the media player application may limit the presentation capabilities of the wireless handset.

Once the wireless handset's presentation capabilities have been determined, the media server may provide the wireless handset with a list of available media content. The list of available media content may be based on the presentation capabilities of the wireless handset. The list may reflect the transmission modes supported by the wireless handset, the transmission modes supported by the applications, transmission modes specified by the user, or other factors.

Figure 3:
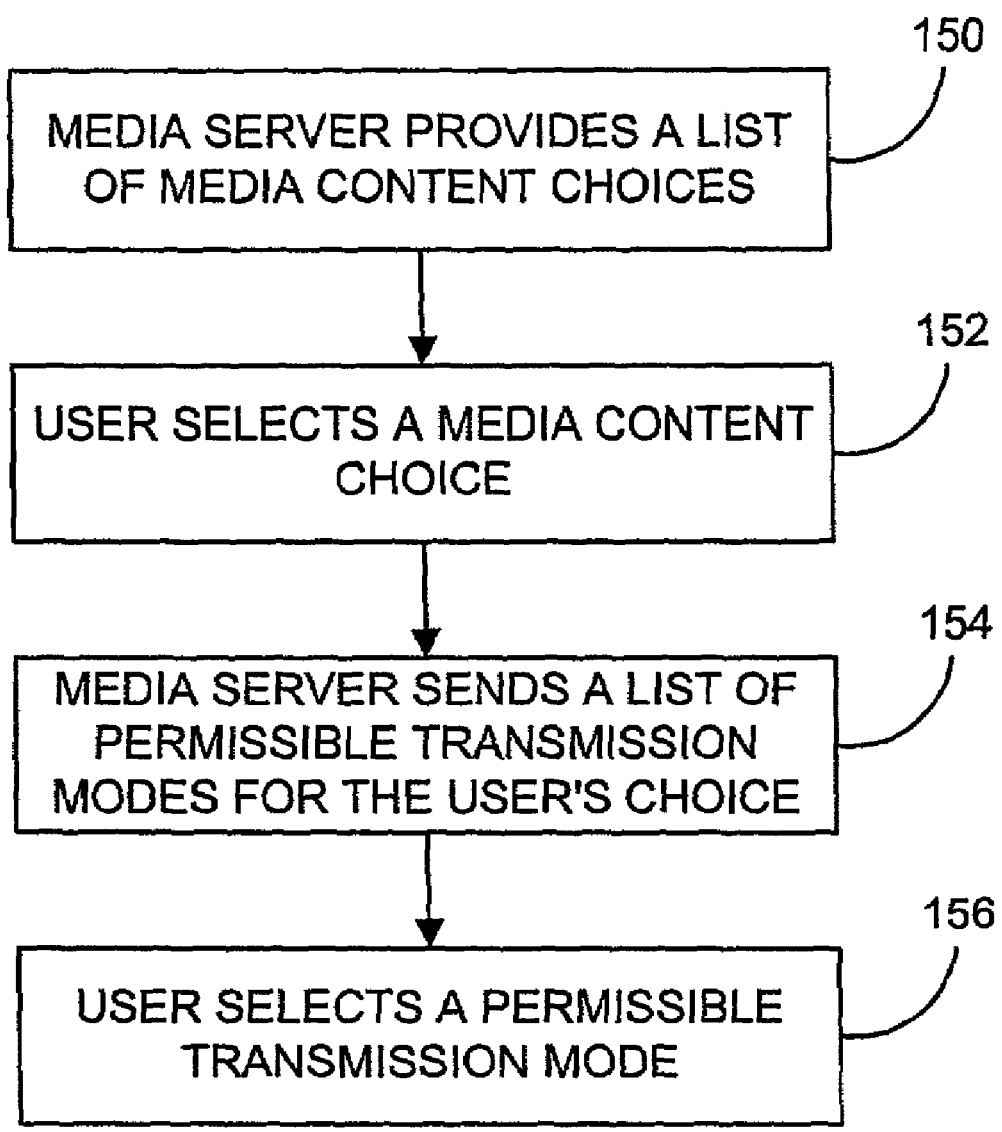
FIG. 3 is a flowchart that depicts one possible embodiment for providing a wireless handset with tailored media content.

The media server may tailor the media content choices presented to the user based on the wireless handset's media presentation capabilities. In one embodiment of tailoring the media content, the media server only provides the wireless handset with media content supported by the wireless handset. FIG. 3 is a flowchart that depicts one possible embodiment for providing a wireless handset with tailored media content. At Step 150, the media server provides a user with a list of media content. Then, at Step 152, the user selects one of the media content choices, and that choice is sent to the media server. Next, at Step 154, the media server provides the user with a list of transmission modes for the selected media content, and the list of transmission modes may be tailored to the presentation capabilities of the wireless handset. The media server may tailor the list of transmission modes, for instance, by beginning with a full set of transmission modes and then removing from that set those transmission modes that are unnecessary for the media type and/or that are not supported by the wireless handset. Many other ways also exist to determine appropriate media content for a wireless handset, and these may also be used. The tailored list of transmission modes for the media content selection is sent to the user, and then, at Step 156, the user selects one of the transmission modes.

Figure 4:
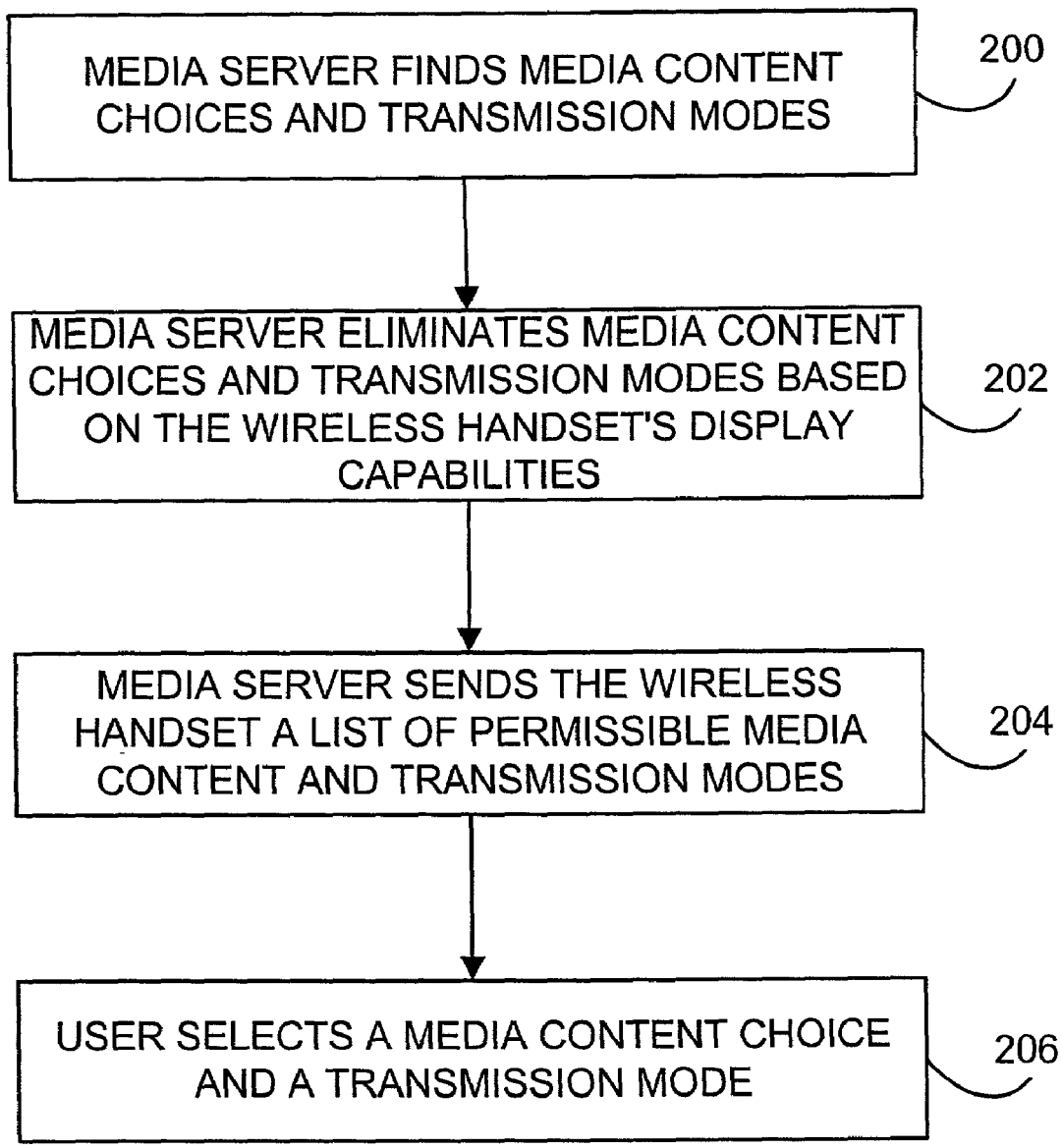
FIG. 4 is a flowchart that depicts an alternate embodiment for providing a wireless handset with tailored media content.

Alternatively, the media server may tailor the media content and transmission modes before providing media content choices to the user. FIG. 4 is a flowchart that depicts one possible embodiment of a method for tailoring media content before providing the media content choices to a user. At Step 200, the media server finds media content choices and their respective transmission modes. Then, at Step 202, the media server eliminates one or more media content choices and transmission modes based on the wireless handset's presentation capabilities. The media server may tailor the content, for example, by starting with the media content choices and then eliminating the media content choices that cannot be transmitted using one of the transmission modes specified by the wireless handset's presentation capabilities. After the media server has tailored the media content choices, the media server, at Step 204, sends the wireless handset the tailored list of media content and transmission modes. The user, at Step 206, then makes a media content and transmission mode choice.

In creating the list of permissible transmission modes, the media server can take into account the presentation capabilities of the wireless handset, which may have been previously determined. For instance, if the wireless handset does not have a display screen, then the media server may only provide the user with audio media content choices. In another example, the wireless handset may only support a specific maximum bit rate for receiving data. Then, the media server may only provide the user with choices for media content in transmission modes that have a bit rate below that maximum bit rate for the wireless handset. In another example, the media server only provides the user with media content choices for which the wireless handset has a media application to support the media content's format. Of course, these examples are not exhaustive; the media server may limit the media content choices provided to the user based on any of the limitations of the wireless handset, its applications or other specified selections.

For example, the type of media content may limit the transmission mode choices, because some of transmission modes may not make sense. For instance, if the media content is audio-only, it would make little or no sense to offer the full-experience mode or the audio-with still options to the user. If the media content is video only, then different audio options may not be offered. However, if the media content is multimedia including video and audio, then the user may receive a full range of audio and video presentation options. The media server may automatically limit the transmission mode choices to the user based on these criteria, because they do not necessarily depend on the wireless device limitations and application limitations provided to the media server.

Limiting the transmission mode choices provided to a wireless handset user may limit the amount of data transferred over the network. By tailoring the transmission mode choices to the wireless handset's presentation capabilities, the media server may send less than all of the possible choices to the wireless handset. The reduced number of choices sent to the wireless handset may require fewer bits to be transmitted to the wireless handset, and by sending fewer overall bits the media content choices may reach the wireless handset faster.

Reducing the amount of data sent from the media server to the wireless handset may also have benefits for the other wireless network users. The wireless network may be constrained in the amount of data it can simultaneously exchange between its users. Therefore, sending less data between the media server and the wireless handset may free more bandwidth for other wireless network users. Additionally, the amount of data traveling on the wireless network may affect the speed with which that data is exchanged between devices. As more data travels across the network, the speed of the data generally slows down. Therefore, reducing the amount of data sent from the media server to the wireless handset may increase the data speed for the wireless handset and the media server, and it may increase the data speed for other users on the wireless network.

Additionally, in a typical wireless network that supports streaming media content to a wireless handset, the user of the wireless handset may be charged based on the amount of data that is transmitted to the wireless handset. The amount of data may be measured in the number of bits, bytes or packets sent. It may also be measured in a different way. By reducing the number of overall bits sent to the wireless handset, the amount charged to the user may be reduced. Therefore, a user may want to limit the transmission modes choices by changing the wireless handset's or an application's configuration.

A user might also be charged based on the speed of the connection. Thus, given that media content can be streamed to the wireless handset at different data rates, the user might opt to have the media transmitted at a lower rate in order to reduce the cost of transmission. Limiting the transmission mode choices provided to the user can allow the user to stay within particular bandwidth limitations. Therefore, a user may want to program the wireless handset or the applications to only show media content choice for transmission modes that stream data at less than the specified bit rate.

Additionally, providing all possible media content choices to the user may mean that a user must wade through a vast number of possible choices before making a selection, and many of the choices may not even be supported by the wireless handset or its applications. By limiting the media content choices presented to the user, the user may have less choices to choose from and may be able to make a selection in a shorter amount of time. Limiting the media content choices presented to the user may also help prevent a user from making an erroneous choice and selecting media content that is not support by the wireless handset or by its applications.

Further, there may be times when a user has no practical use for a certain type of media presentation. For instance, if a user is driving a car, then the user may not be able to safely view video or still images sent to the user's wireless handset. The user may just want to receive audio. In that situation, the user might opt to have the media transmitted in the audio-only mode, and the user may configure the wireless handset so that only audio content choices are received from the media server. However, if the user is a passenger in a car, the user might prefer to receive the media in the full-experience mode, and the user may configure the wireless handset so that the media server provides all types of content choices to the wireless handset.

Figure 5:
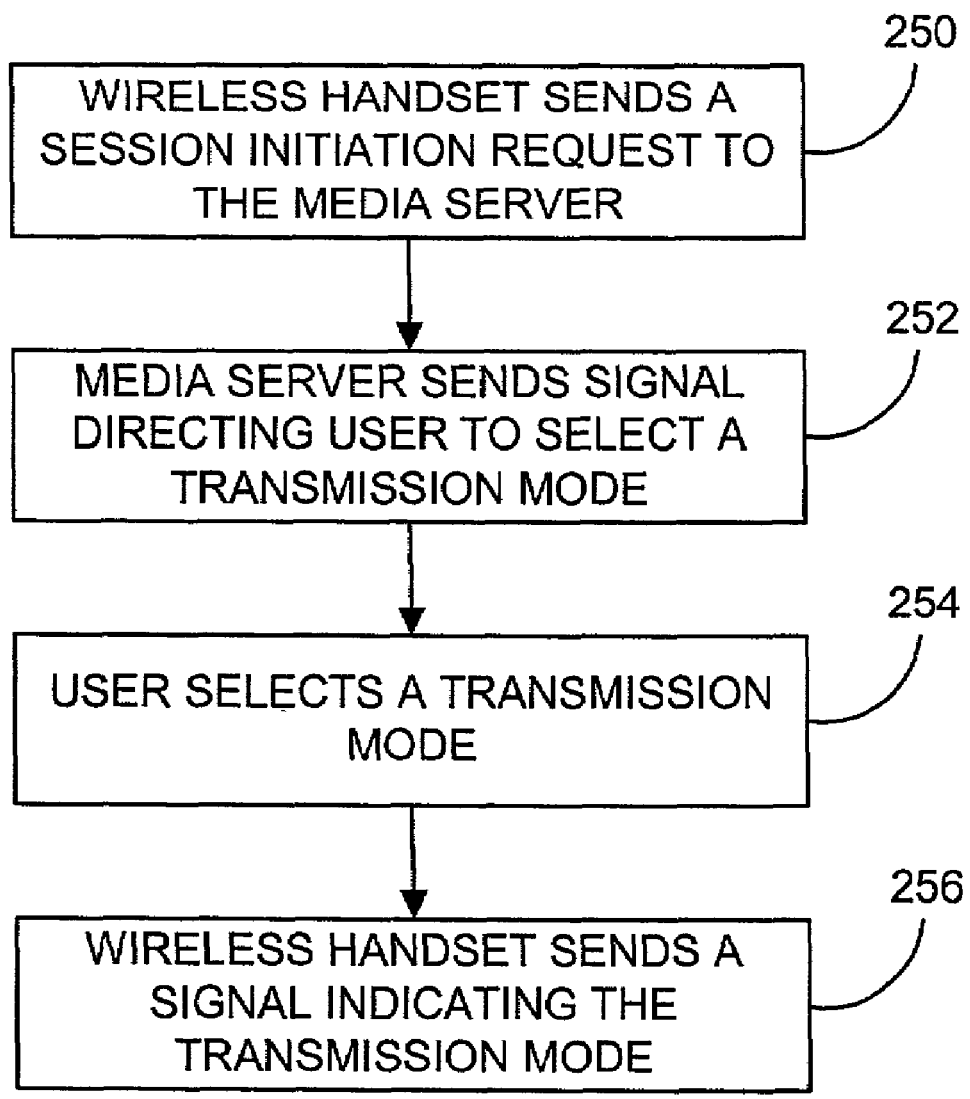
FIG. 5 is a flowchart that shows one embodiment of a process for selecting a transmission mode.

Once the available transmission modes have been provided to the user, the user then selects a specific transmission mode. FIG. 5 is a flowchart that shows one example process for selecting a transmission mode. At Step 250, the wireless handset sends a standard or proprietary session initiation request, such as a SIP INVITE message, to the media server. Upon receipt of the request, the media server sends a standard or proprietary signal to the media player directing the media player to prompt the user to select from a number of transmission modes, which is depicted at Step 252. At Step 254, the user then selects one of the indicated transmission modes, and, at Step 256, the media player sends a standard or proprietary signal to the media server indicating the selected transmission mode. The media server may then use this selected transmission mode in streaming media content to the client device.

Figure 6:
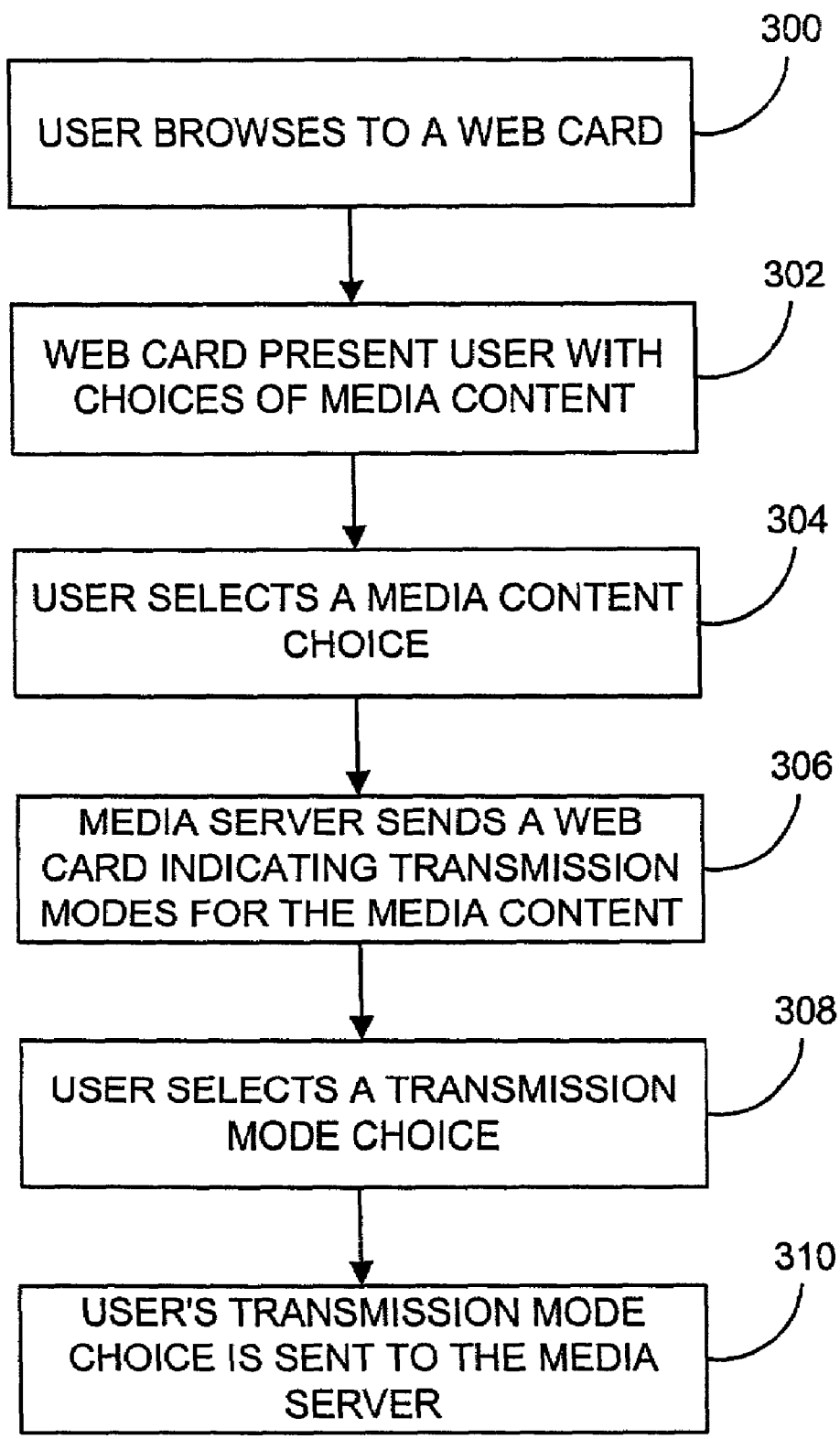
FIG. 6 is a flowchart that shows an embodiment of a process for selecting media content.

FIG. 6 is a flowchart that shows another example method for selecting media content and a transmission mode. At Step 300, the wireless handset user browses to a web card. The web card may be a "choice card", and, at Step 302, the web card presents the user with choices of media content. At Step 304, the user selects the desired media content. In turn, the media server may send a MODE-CHOICE web card to the wireless handset. The MODE-CHOICE web card may also be a choice card and may present the user with choices of streaming media transmission modes, shown at Step 306. The MODE-CHOICE card may be coded such that, when the user selects one of the transmission mode choices, the browser in turn sends the media server a corresponding signal indicating the chosen transmission mode, shown at Step 308. Finally, at Step 310, the media server streams the media content to the wireless handset at the chosen transmission mode. While it is possible that one device, such as a media server, provides media content choices and transmission modes to the client device, and another device, such as a media server, streams the media content to the client device, it is preferred that the same device performs both functions.

An exemplary embodiment of the present invention has been described above. Those skilled in the art will understand, however, that changes and modifications may be made to this embodiment without departing from the true scope and spirit of the present invention, which is defined by the claims.

I claim:

1. A method of selecting a transmission mode for streaming media content to a wireless handset, the method comprising:
presenting on the wireless handset a set of choices indicating transmission modes for streaming media content to the wireless handset, wherein the set of choices is tailored based on at least one presentation capability of the wireless handset;
receiving from a user of the wireless handset an indication of a transmission mode selected from the set of choices;
sending from the wireless handset to a media server an indication of the selected transmission mode;
receiving a list of available media content, wherein all media content in the list of available media content is compatible with the indicated transmission mode;
receiving from a user a selection of one of the media content in the list of available media content; and
receiving into the wireless handset the selected media content streamed from the media server at the selected transmission mode.

2. The method of claim 1, further comprising:
sending the set of choices from the media server to the wireless handset.

3. The method of claim 1, further comprising:
the media server establishing the set of choices to send to the wireless handset.

4. The method of claim 3, further comprising:
sending from the wireless handset to the media server a capability indication for the wireless handset; and
the media server using the capability indication as a basis to establish the set of choices to send to the wireless handset.

5. The method of claim 4, wherein sending a capability indication further comprises sending from the wireless handset to the media server a SIP INVITE message containing an SDP structure that indicates the capability indication.

6. The method of claim 4, wherein sending a capability indication further comprises sending from the wireless handset to the media server an indication of a make and model of the wireless handset.

7. The method of claim 4, wherein the capability indication indicates the at least one presentation capability and wherein the at least one presentation capability defines a capability of a media player application.

8. The method of claim 3, wherein the media content defines a type, the method further comprising:
the media server using the type of the media content as a basis to establish the set of choices to send to the wireless handset.

9. The method of claim 4, wherein the capability indication indicates the at least one presentation capability and wherein the at least one presentation capability is selected by the user.

10. The method of claim 1, wherein the at least one presentation capability defines a presentation capability of a media player application.

11. The method of claim 1, wherein the at least one presentation capability includes a plurality of presentation capabilities.

12. A wireless handset comprising:
a processor;
data storage;
a screen display;
transmission-choice logic stored in the data storage and executable by the processor (i) to present on the screen display a set of choices indicating available transmission modes for streaming media to the wireless handset, wherein the available transmission modes are based at least in part on a presentation capability of the wireless handset, (ii) to receive a user selection of one of the choices, and (iii) to send to a media server an indication of the selected transmission mode;
selection logic, stored in the data storage and executable by the processor (i) to receive from the media server a list of available media content, wherein all media content in the list of available media content is compatible with the selected transmission mode, (ii) to receive a user selection of one of the available media content from the list, and (iii) to provide the selection of the one of the available media content to the media server; and
media playing logic stored in the data storage and executable by the processor (i) to receive media streamed from the media server to the wireless handset at the selected transmission mode and (ii) to present the streamed media to the user.

13. A media server comprising:
a processor;
data storage;
media content stored in the data storage;
transmission-choice logic stored in the data storage and executable by the processor, in response to a request from a wireless handset to receive streaming media from the media server, (i) to send to the wireless handset a set of choices indicating transmission modes available for streaming the media content to the wireless handset, wherein the set of choices indicating transmission modes is based, at least in part, on a presentation capability of the wireless handset, and (ii) to then receive from the wireless handset an indication of a transmission mode selected by a user of the wireless handset;
list logic stored in the data storage and executable by the processor to i) establish a list of available media content, wherein all media content in the list is compatible with the indicated transmission mode, ii) to send the list to the wireless handset, and iii) to receive from the wireless handset and indication of one of the media content in the list;

media streaming logic stored in the data storage and executable by the processor to stream the indicated media content to the wireless handset at the transmission mode selected by the user;

choice-establishment logic stored in the data storage and executable by the processor to establish the set of choices; and capability-logic stored in the data storage and executable by the processor to receive from the wireless handset a capability indication for the wireless handset.

14. The media server of claim 13, wherein the media content defines a type, and wherein the choice-establishment logic is executable by the processor to establish the set of choices based at least in part on the type of the media content.

15. The media server of claim 13, wherein the choice-establishment logic is executable by the processor to establish the set of choices based at least in part on the capability indication.

16. A method for streaming media content to a wireless handset, the method comprising:

providing a user of the wireless handset with a list of media content choices;

determining a list of permissible transmission modes for a selected media content choice, the selected media content choice having been selected by the user from the list of media content choices;

providing the user with the list of permissible transmission modes for the selected media content choice, wherein the list of permissible transmission modes is tailored to the presentation capabilities of the wireless handset;

receiving into the wireless handset the selected media content choice at a selected transmission mode, the selected transmission mode having been selected by the user from the list of permissible transmission modes.

17. The method of claim 16, wherein determining a list of permissible transmission modes for a selected media content choice comprises:

identifying a full set of transmission modes; and removing from the full set of transmission modes any transmission mode that is not supported by the wireless handset.

18. The method of claim 16, wherein determining a list of permissible transmission modes for a selected media content choice comprises:

identifying a fill set of transmission modes; and removing from the full set of transmission modes any transmission mode that is unnecessary for the media type of the selected media content choice.

\* \* \* \* \*

UNITED STATES PATENT AND TRADEMARK OFFICE
CERTIFICATE OF CORRECTION

| | | |
|---|---|---|
| PATENT NO. | : 7,593,686 B1 | Page 1 of 1 |
| APPLICATION NO. | : 10/059538 | |
| DATED | : September 22, 2009 | |
| INVENTOR(S) | : Dale Knoop | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1885 days.

Signed and Sealed this

Twenty-eighth Day of September, 2010

David J. Kappos
*Director of the United States Patent and Trademark Office*